United States Patent
Mizuno et al.

(10) Patent No.: US 10,120,493 B2
(45) Date of Patent: Nov. 6, 2018

(54) ELECTRONIC DEVICE

(71) Applicant: KYOCERA CORPORATION, Kyoto (JP)

(72) Inventors: Hayato Mizuno, Osaka (JP); Naoki Matsuo, Nara (JP)

(73) Assignee: KYOCERA CORPORATION, Kyoto (JP)

( * ) Notice: Subject to any disclaimer, the term of this patent is extended or adjusted under 35 U.S.C. 154(b) by 22 days.

(21) Appl. No.: 15/246,372

(22) Filed: Aug. 24, 2016

(65) Prior Publication Data

US 2016/0364075 A1 Dec. 15, 2016

Related U.S. Application Data

(63) Continuation of application No. PCT/JP2015/055147, filed on Feb. 24, 2015.

(30) Foreign Application Priority Data

Feb. 26, 2014 (JP) .................. 2014-035314

(51) Int. Cl.
*G06F 3/041* (2006.01)
*G06F 1/16* (2006.01)
*G06F 3/044* (2006.01)

(52) U.S. Cl.
CPC .......... *G06F 3/0416* (2013.01); *G06F 1/1626* (2013.01); *G06F 3/044* (2013.01)

(58) Field of Classification Search
None
See application file for complete search history.

(56) References Cited

U.S. PATENT DOCUMENTS

| 2011/0134070 A1* | 6/2011 | Wang ...................... G06F 3/041 345/174 |
| 2013/0002133 A1* | 1/2013 | Jin ............................ G09F 9/33 313/511 |
| 2014/0016048 A1* | 1/2014 | Omote .................... G06F 3/044 349/12 |

FOREIGN PATENT DOCUMENTS

JP 2011-170511 A 9/2011

OTHER PUBLICATIONS

International Search Report in International Application No. PCT/JP2015/055147, dated Mar. 24, 2015, in 2 pages.

* cited by examiner

*Primary Examiner* — Chad Dicke
(74) *Attorney, Agent, or Firm* — Duane Morris LLP

(57) ABSTRACT

An electronic device of the present disclosure includes a casing, a translucent panel including a curved portion the curved portion being bent toward the casing, and a touch panel located on a rear surface of the translucent panel, the touch panel covering the curved portion, the touch panel including a transparent electrode or a wire electrically connected to the transparent electrode. The touch panel includes a curved region facing the curved portion. The transparent electrode and/or the wire include/includes an inclined wiring portion located in the curved region.

4 Claims, 7 Drawing Sheets

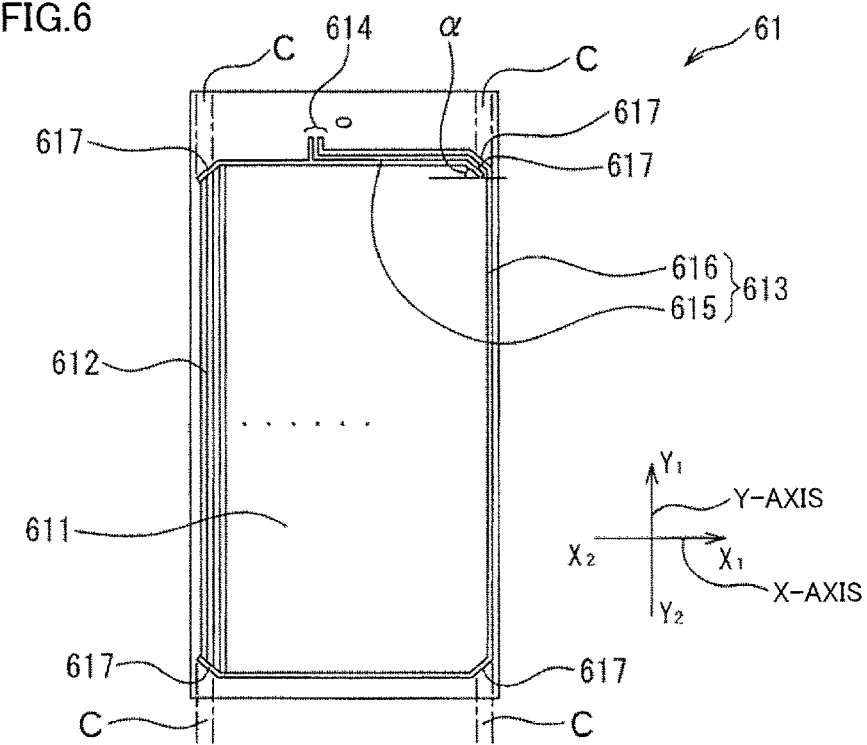
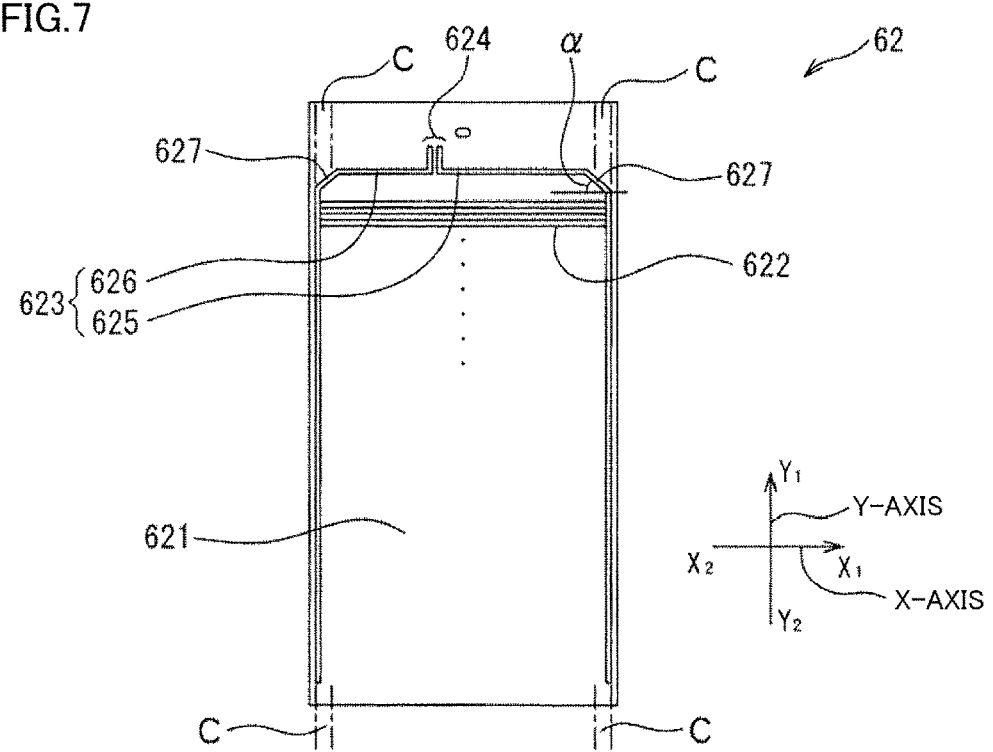

ELECTRONIC DEVICE

CROSS-REFERENCE TO RELATED APPLICATION

The present application is a continuation based on PCT Application No. PCT/JP2015/055147 filed on Feb. 24, 2015, which claims the benefit of Japanese Application No. 2014-035314, filed on Feb. 26, 2014. PCT Application No. PCT/JP2015/055147 is entitled "Electronic Instrument", and Japanese Application No. 2014-035314 is entitled "Electronic Device." The content of which are incorporated by reference herein in their entirety.

FIELD

The present disclosure relates to an electronic device with a touch panel attached to a translucent panel including a curved portion at an edge.

BACKGROUND

An electronic device, such as a mobile phone or a smartphone, includes a touch panel and a display, as well as a translucent panel made of glass or the like for protecting the touch panel and the display.

A capacitance type touch panel may have a transparent electrode to be bonded to a translucent panel, and may have a lead wire located on the outer periphery of the transparent electrode to extract an input signal from the transparent electrode.

SUMMARY

In recent years, a translucent panel has been proposed which includes a curved portion in which an edge of the translucent panel is bent toward a casing.

An electronic device according to an aspect of the present disclosure includes a casing, a translucent panel including a curved portion, the curved portion being bent toward the casing, and a touch panel located on a rear surface of the translucent panel, the touch panel covering the curved portion, the touch panel including at least one of a transparent electrode and a wire electrically connected to the transparent electrode. The touch panel includes a curved region facing the curved portion. At least one of the transparent electrode and the wire includes an inclined wiring portion located in the curved region.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 shows a first electrode unit as seen from the rear side.
FIG. 7 shows a second electrode unit as seen from the rear side.

DETAILED DESCRIPTION

Hereinafter, an embodiment of the present disclosure will be described with reference to the drawings.

Examples of an electronic device 10 to which the present disclosure is applicable can include a mobile phone, such as a smartphone, a tablet computer, a PDA (Personal Digital Assistant), a portable music player, a notebook personal computer, a game machine, an arm-wearable electronic device, and the like. These are not limitations, but any electronic device can be adopted as along as, for example, information can be displayed on a screen thereof and a touch operation can be performed on the screen. Hereinafter, an embodiment in which the present disclosure is applied to a smartphone will be described.

Figure 1:
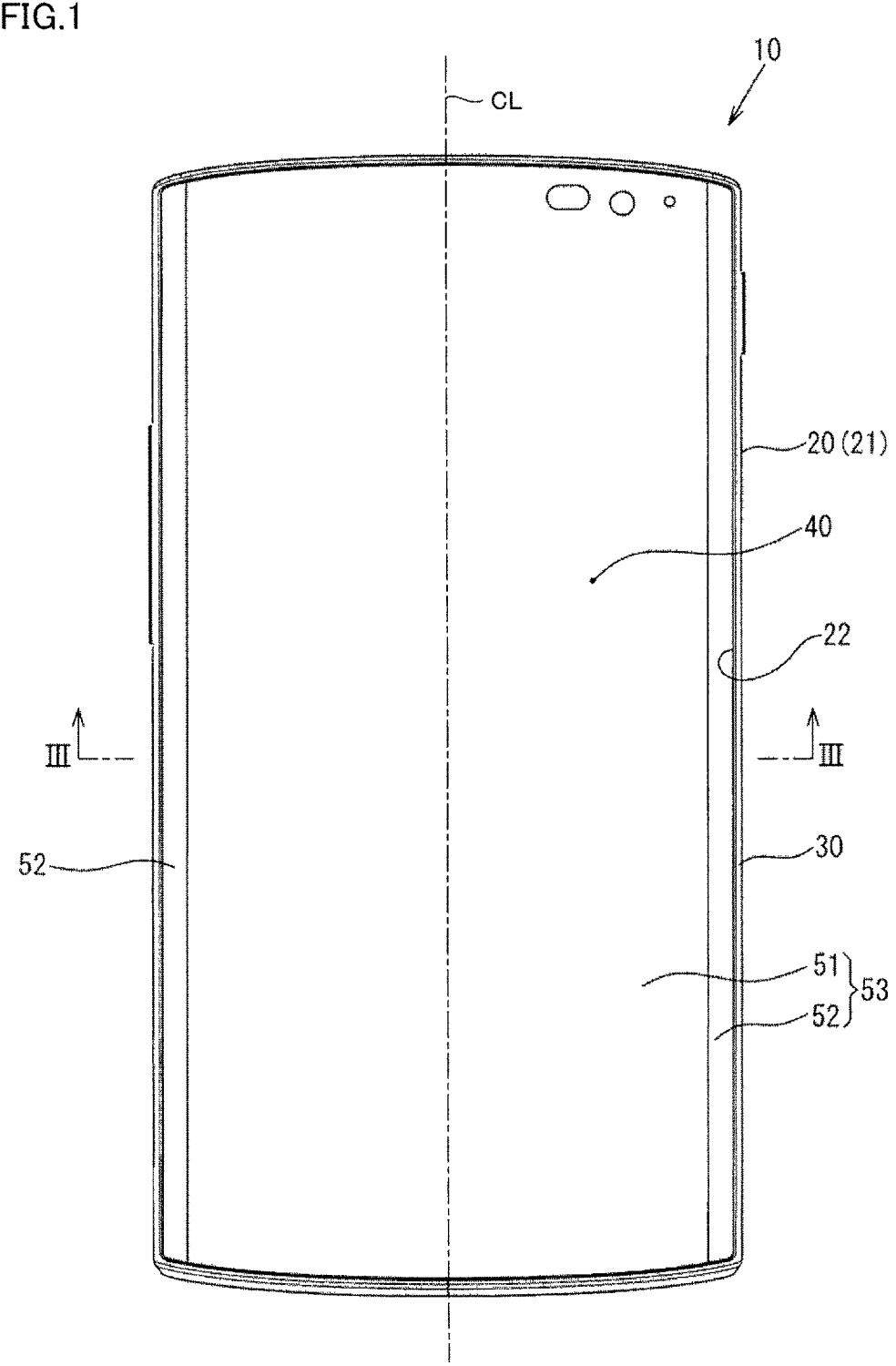
FIG. 1 is a plan view of an electronic device.
Figure 2:
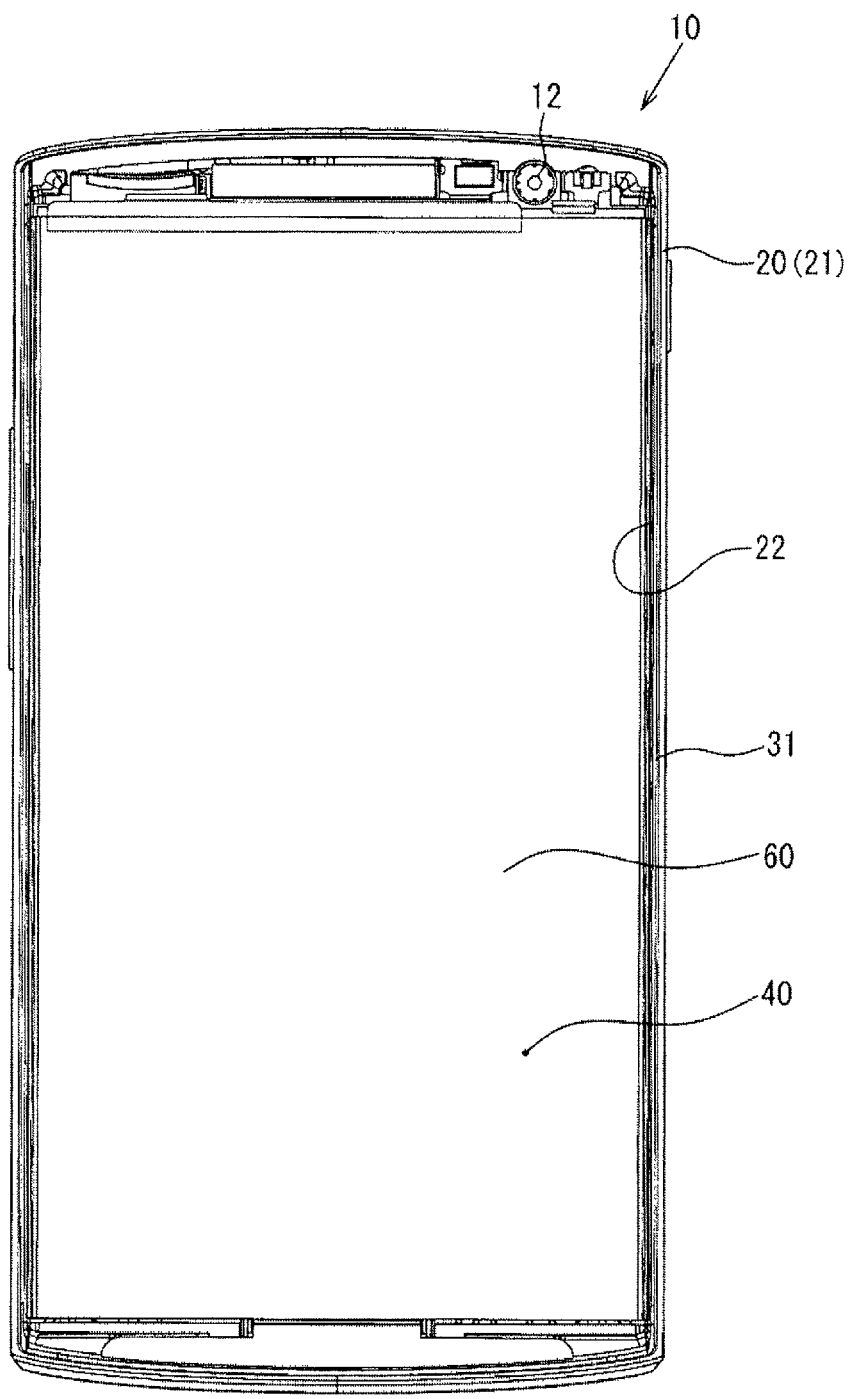
FIG. 2 is a plan view of the electronic device with a translucent panel removed.

FIG. 1 is a front view showing an embodiment of electronic device 10. As shown in the drawing, electronic device 10 is configured such that a surface of a casing 20 is covered with a translucent panel 50. FIG. 2 shows a state where translucent panel 50 has been removed from electronic device 10 for ease of description.

Figure 3:
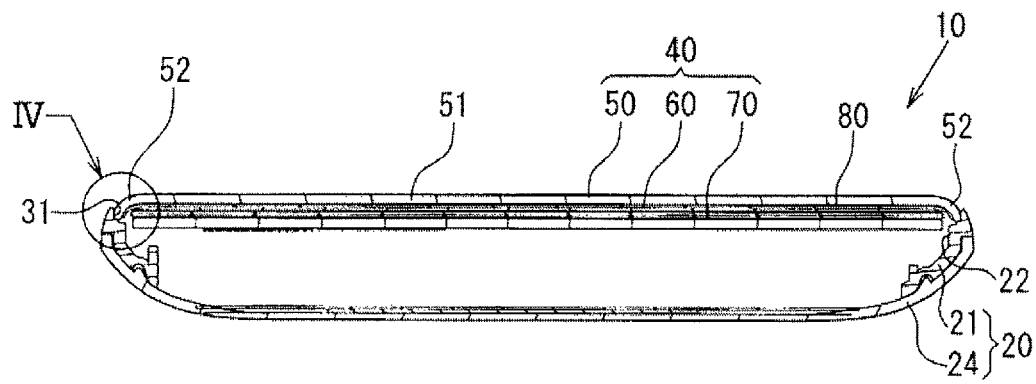
FIG. 3 is a cross sectional view taken along the line shown in FIG. 1.
Figure 4:
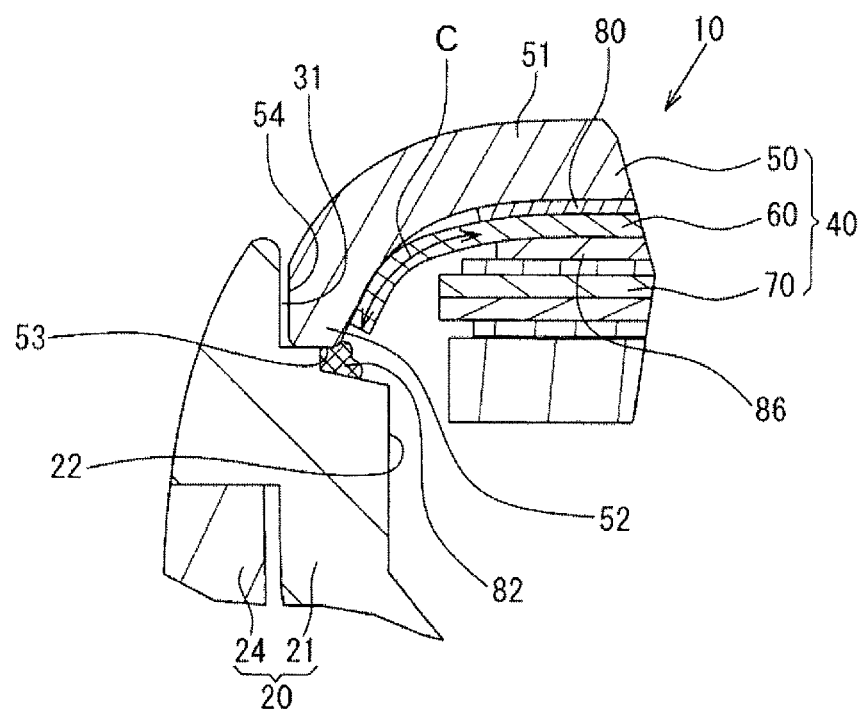
FIG. 4 is an enlarged cross sectional view of a circled part IV shown in FIG. 3.
Figure 5:
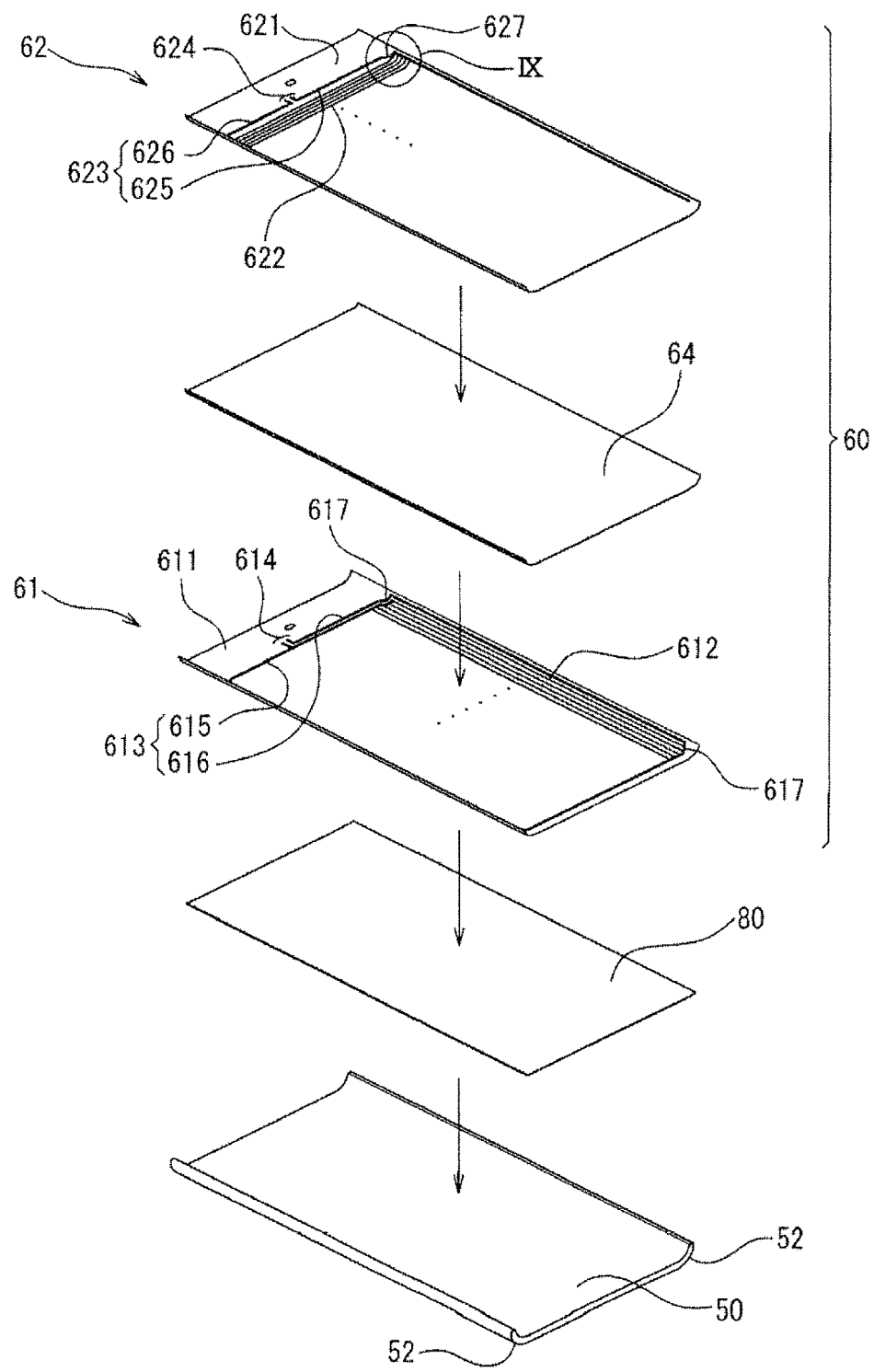
FIG. 5 is an exploded perspective view of the translucent panel and a touch panel of the electronic device as seen from the rear side.

As shown in FIGS. 3 to 5, electronic device 10 includes translucent panel 50 exposed to the outside, and a touch panel 60 located on the rear side thereof. Electronic device 10 can further include a display 70.

Translucent panel 50 is a light transmitting panel, and can be formed from glass or resin. Translucent panel 50 serves as a member for protecting touch panel 60 or display 70 which will be described later. When a user touches translucent panel 50, an operation is performed on touch panel 60. Display 70 is visually recognized through translucent panel 50 and touch panel 60. Translucent panel 50 may be made of any single crystal material, such as a sapphire panel, that can include a curved portion 52 as will be described later. The sapphire panel refers to a panel made of a single crystal material containing alumina ($Al_2O_3$) as a main component. The "main component" specifically refers to a component occupying more than or equal to 50 mass %, preferably more than or equal to 70 mass %. As the material of translucent panel 50, a single crystal having an $Al_2O_3$ purity of more than or equal to approximately 90% is desirable in terms of less susceptibility to scratches and more reliable prevention of cracks, chips and the like. Besides a sapphire panel, examples of a single crystal material to be employed for translucent panel 50 can include diamond, zirconia, titania, crystal, lithium tantalate, aluminum oxynitride, and the like. As for these materials, a single crystal having a purity of more than or equal to approximately 90% is also preferable in terms of less susceptibility to scratches and more reliable prevention of cracks, chips and the like.

In the present disclosure, translucent panel 50 is a so-called curved panel including curved portion 52 in which the edge area is bent downward from a substantially rectangular flat surface 51 at the central area, as shown in FIGS. 3 and 4. The term "downward" in FIGS. 3 and 4 refers to a direction toward casing 20 or a direction toward a rear surface of translucent panel 50, for example. Curved portion 52 can be formed by bending a planar glass or a resin thin plate. In the illustrated embodiment, curved portion 52 is formed to present substantially a quarter circle extending from flat surface 51 and having a substantially constant curvature. In an embodiment, curved portion 52 is located at a position closer to the across-the-width end of translucent panel 50 than the central line CL (see FIG. 1) of translucent panel 50. More specifically, curved portion 52 is located in proximity to each of the opposed two ends in the longitudinal direction of substantially rectangular translucent panel 50. Curved portion 52 can also be located in proximity to each of the ends in the direction orthogonal to the longitudinal direction, or can also be located in proximity to only one end. Although the panel having flat surface 51 in proximity to the center is described as an example of translucent panel 50, this is not a limitation in the present disclosure, but the panel may have a curved surface in proximity to the center.

As shown in FIG. 4, more specifically, curved portion 52 is bent arcuately downward from flat surface 51, and a lower edge 53 thereof has been cut or polished so as to be substantially parallel to flat surface 51. The both side edges of translucent panel 50 are formed by partly cutting or polishing curved portion 52 to present an edge portion 54 substantially orthogonal to flat surface 51.

Touch panel 60 covering flat surface 51 and curved portion 52 of translucent panel 50 is located on the rear surface of translucent panel 50, as shown in FIGS. 4 and 5. Touch panel 60 is bent substantially along curved portion 52 of translucent panel 50 in a curved region indicated by the character C in FIG. 4.

As touch panel 60, a capacitance type or resistive film type touch panel can be illustrated. Touch panel 60 is attached to translucent panel 50 by, for example, being affixed with a panel-side adhesive sheet 80 which is an affixing member. A transparent sheet with an adhesive applied to the both sides thereof, such as an optical clear adhesive (OCA), can be employed as panel-side adhesive sheet 80. Instead of an adhesive sheet, translucent panel 50 and touch panel 60 may be attached with an adhesive itself.

FIG. 5 is an exploded perspective view of translucent panel 50 and touch panel 60. Illustration of display 70 is omitted.

As shown in FIG. 5, touch panel 60 may include a first electrode unit 61 facing the rear surface of translucent panel 50 with panel-side adhesive sheet 80 interposed therebetween, and a second electrode unit 62 facing this first electrode unit 61 with an inter-unit adhesive sheet 64 interposed therebetween. In the exploded perspective view of FIG. 5, first electrode unit 61 and second electrode unit 62 have already been bent in curved region C facing curved portion 52 of translucent panel 50. These electrode units 61 and 62 may be bent in curved region C when touch panel 60 is attached to translucent panel 50.

First electrode unit 61 includes a flexible first transparent substrate 611, a first transparent electrode 612 and a first lead wire 613 electrically connected to first transparent electrode 612, as shown in FIGS. 5 and 6.

Second electrode unit 62 includes a flexible second transparent substrate 621, a second transparent electrode 622 and a second lead wire 623 electrically connected to second transparent electrode 622, as shown in FIGS. 5 and 7.

First transparent substrate 611 and second transparent substrate 621 can be a transparent flexible film of, for example, PET (polyethylene terephthalate), PC (polycarbonate), PE (polyethylene), PP (polypropylene), PVC (polyvinyl chloride), PS (polystyrene), PMMA (polymethyl methacrylate resin), COC (cycloolefin copolymer), or the like.

Transparent electrodes 612, 622 located on transparent substrates 611, 621 may include ITO (indium tin oxide), IZO (indium zinc oxide), AZO (aluminum zinc oxide), ATO (antimony tin oxide), $SnO_2$ (stannic oxide), ZnO (zinc oxide), or the like. Transparent electrodes 612, 622 may be manufactured by a thin film method, such as sputtering or vapor deposition method, a transfer method, or an application method of applying and drying a liquefied material, for example.

More specifically, supposing that an X-axis indicates the width direction and a Y-axis indicates the longitudinal direction as shown in FIG. 6, first electrode unit 61 includes a plurality of first transparent electrodes 612 substantially in parallel to the Y-axis direction. Second electrode unit 62 includes a plurality of second transparent electrodes 622 substantially in parallel to the X-axis direction, namely, substantially perpendicularly to first transparent electrodes 612, as shown in FIG. 7.

A region where above-described first transparent electrodes 612 and second transparent electrodes 622 are located serves as an operational region of touch panel 60.

Transparent electrodes 612, 622 are formed on the rear surface of transparent substrates 611, 621, namely, a surface of transparent substrates 611, 621 to be distant from translucent panel 50 when transparent substrates 611, 621 are attached to translucent panel 50. When touch panel 60 is bent in accordance with the shape of curved portion 52 of translucent panel 50 as will be described later, transparent electrodes 612, 622 are less likely to be pulled and are prevented from breaking.

First transparent electrodes 612 and second transparent electrodes 622 are electrically connected to first lead wire 613 and second lead wire 623 for extracting input signals, respectively. As shown in FIGS. 6 and 7, transparent electrodes 612, 622 are located on the same surface as transparent electrodes 612, 622 (in the illustration, on the rear side) so as to extend along the outer periphery of transparent electrodes 612, 622, namely, the circumference of transparent substrates 611, 621. Lead wires 613, 623 have contacts 614, 624, respectively, at an upper portion in a $Y_1$ direction in the drawing, and transmit input signals to a control unit of electronic device 10 through a flexible substrate not shown or the like.

Lead wires 613, 623 are each shown as a single wide wire in FIGS. 6, 7 and the like, but actually each include a plurality of wires electrically connected to transparent electrodes 612, 622, respectively.

Lead wires 613, 623 may include a metal, such as Ag (silver), Cr (chromium), Al (aluminum), Mo (molybdenum), Cu (copper), and Au (gold) or an alloy containing them. Lead wires 613, 623 are also disposed on transparent substrates 611, 621 by a method similar to that of forming transparent electrodes 612, 622.

More specifically, as shown in FIG. 6, first lead wire 613 includes a wiring pattern 615 extending from contact 614 to the both sides in the X-axis direction and electrically connected to $Y_1$-side ends of first transparent electrodes 612, as well as a wiring pattern 616 extending in the $X_1$ direction from contact 614, running in the vicinity of a side edge of first transparent substrate 611 in a $Y_2$ direction, being routed to the $X_2$ direction at a $Y_2$-side edge of first transparent substrate 611, and electrically connected to $Y_2$-side ends of first transparent electrodes 612.

As shown in FIG. 7, second lead wire 623 includes a wiring pattern 625 extending in the $X_1$ direction from contact 624, extending in the $Y_2$ direction from the vicinity of a side edge of second transparent substrate 621, and electrically connected to $X_1$-side ends of second transparent electrodes 622, as well as a wiring pattern 626 extending in the $X_2$ direction from contact 624, extending in the $Y_2$ direction from the vicinity of a side edge of second transparent substrate 621, and electrically connected to $X_2$-side ends of second transparent electrodes 622.

In a curved region C in which transparent substrates 611, 621 face curved portion 52 of translucent panel 50, wiring patterns 615, 616 of first lead wire 613 and wiring patterns 625, 626 of second lead wire 623 are located in an inclined manner with respect to the X- and Y-axes without crossing perpendicularly thereto, as shown in FIGS. 6 and 7.

More specifically, as for first lead wire 613, the both ends of wiring pattern 615, a corner portion in which wiring pattern 616 is bent from the X-axis direction to the Y-axis direction and from the Y-axis direction to the X-axis direction, as well as a termination of wiring pattern 616 are each inclined in curved region C, as shown in FIG. 6. These portions will be referred to as a first inclined wiring portion 617.

Similarly, as for second lead wire 623, corner portions in which wiring patterns 625, 626 are bent from the X-axis direction to the Y-axis direction are each inclined in curved region C, as shown in FIG. 7. These portions will be referred to as a second inclined wiring portion 627.

Since lead wires 613, 623 have the portions crossing curved region C formed as inclined wiring portions 617, 627, respectively, a force in a bending direction exerted when bending touch panel 60 in accordance with the shape of curved portion 52 of translucent panel 50 can be distributed as will be described later, and breaking of lead wires 613, 623 is prevented.

As shown in FIGS. 6 and 7, it is desirable to form lead wires 613, 623 such that inclined wiring portions 617, 627 cross the X-axis, namely, curved region C, at an inclination angle α of more than or equal to 45° and less than or equal to 70°. If inclination angle α is less than 45°, it may be impossible to fully obtain the effect of preventing breaking by the inclination, and if inclination angle α exceeds 70°, inclined wiring portions 617, 627 may become long, and the effect of preventing breaking may be substantially saturated.

First electrode unit 61 and second electrode unit 62 formed as described above are affixed to each other with an inter-unit adhesive sheet 64 to constitute touch panel 60. A transparent sheet with an adhesive applied to the both sides thereof, such as an optical clear adhesive (OCA), can be employed as inter-unit adhesive sheet 64. Instead of an adhesive sheet, first electrode unit 61 and second electrode unit 62 may be attached to each other with an adhesive itself.

As for touch panel 60, a transparent substrate, a transparent film or the like can also be bonded to the rear surface of second electrode unit 62 in order to avoid second electrode unit 62 from being exposed to the outside on the rear side.

As shown in FIGS. 4 and 5, touch panel 60 is affixed to the rear surface of translucent panel 50 with panel-side adhesive sheet 80.

Figure 8:
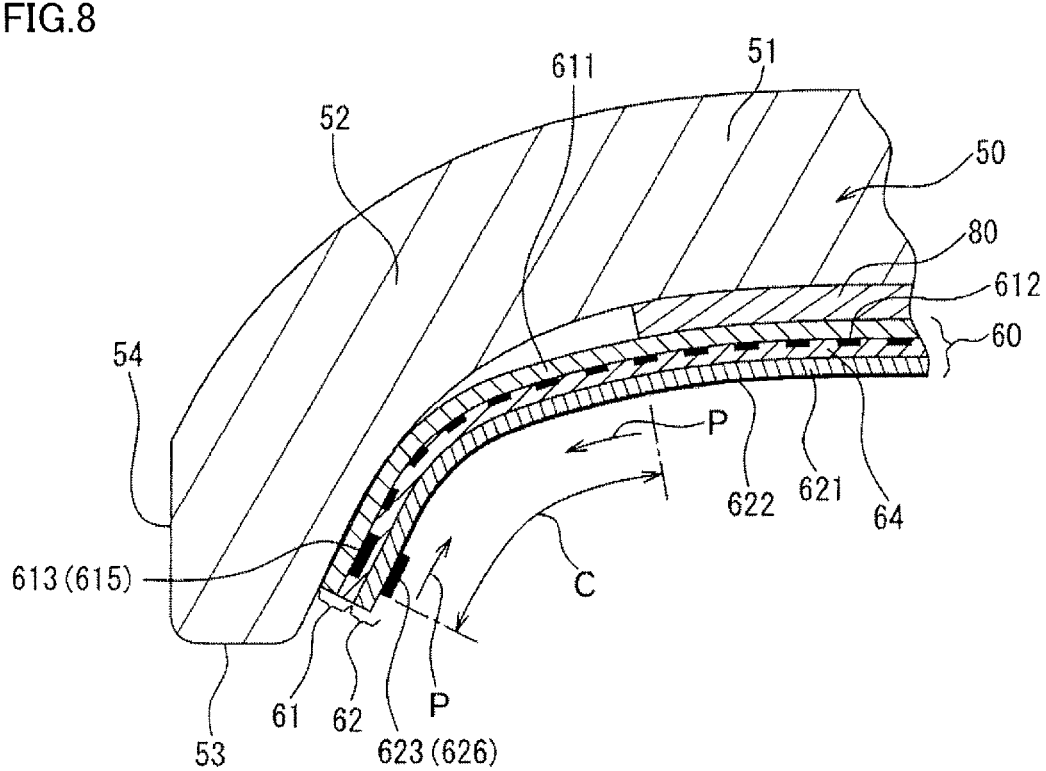
FIG. 8 is an enlarged cross sectional view of the translucent panel and the touch panel of the electronic device around a curved portion.

On this occasion, touch panel 60 is bent in curved region C in accordance with the shape of curved portion 52 of translucent panel 50, as shown in the enlarged view of FIG. 8.

On this occasion, transparent electrodes 612, 622 of first electrode unit 61 and second electrode unit 62 are also bent. Since transparent electrodes 612, 622 are located on the rear side of transparent substrates 611, 621 in an embodiment of the present disclosure, a force in a contraction direction indicated by an arrow P in FIG. 8 is exerted on transparent electrodes 612, 622 in curved region C. Breaking of transparent electrodes 612, 622 is thereby prevented. If transparent electrodes 612, 622 are located on the front side of transparent substrates 611, 621, a force in an elongation direction will be exerted in curved region C, so that transparent electrodes 612, 622 may be pulled and broken. In an embodiment of the present disclosure, a reverse force in the contraction direction is exerted, so that transparent electrodes 612, 622 are unlikely to be pulled. This can advantageously prevent breaking.

When touch panel 60 is bent in curved region C, lead wire 613 of first electrode unit 61 and lead wire 623 of second electrode unit 62 are also bent. Since lead wires 613, 623 are located on the rear side of transparent substrates 611, 621, respectively, in the present disclosure, a force in the contraction direction indicated by arrow P in FIG. 8 is exerted on lead wires 613, 623 in curved region C. Similarly to transparent electrodes 612, 622, breaking of lead wires 613, 623 is thus prevented.

Figure 9:
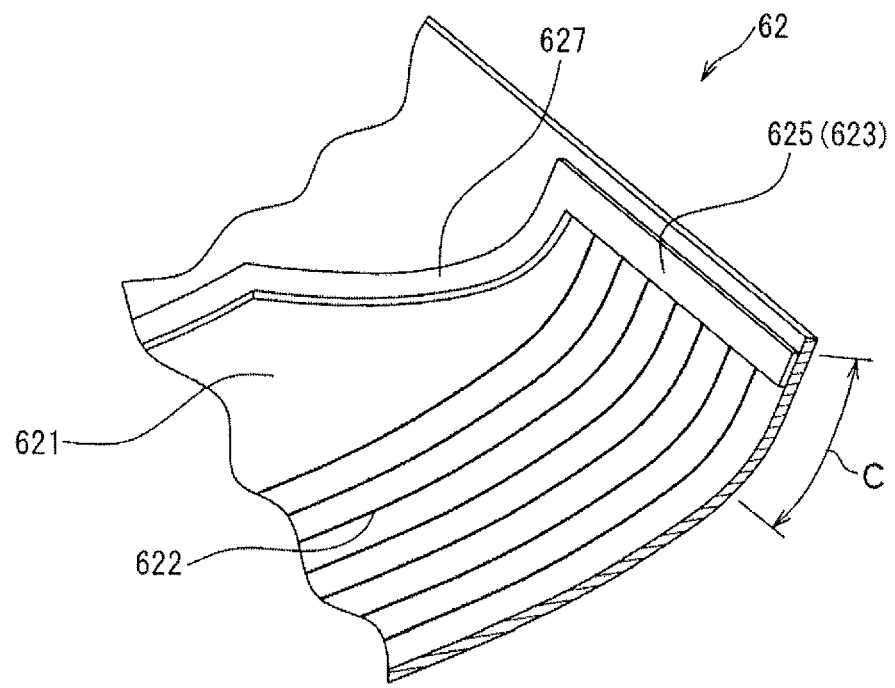
FIG. 9 is an enlarged cross sectional view of a circled part IX shown in FIG. 5.

Lead wires 613, 623 respectively include inclined wiring portions 617, 627 obtained by inclining the portions crossing curved region C. When touch panel 60 is bent in curved region C, inclined wiring portions 617, 627 spirally enter curved region C as shown in FIG. 9, and thus can distribute a force in the bending direction as compared with the case of entering perpendicularly to curved portion 52. As a result, breaking of lead wires 613, 623 can be prevented.

The effect of preventing breaking of inclined wiring portions 617, 627 described above can also be obtained when lead wires 613, 623 are located on the front side of transparent substrates 611, 621, respectively.

Panel-side adhesive sheet 80 for bonding touch panel 60 to translucent panel 50 is desirably formed such that its width is short enough to be substantially equal to the width of flat surface 51 of translucent panel 50, rather than covering the entire surface of touch panel 60, as shown in FIG. 4.

As described above, by shortening the width of panel-side adhesive sheet 80, adhesive sheet 80 will not be located in curved portion 52 of translucent panel 50 and curved region C of touch panel 60, and portions on the both sides of touch panel 60 protruding from adhesive sheet 80 do not fully follow curved portion 52 because of its flexibility, but are gently curved so that the ends abut on curved portion 52, as shown in FIG. 4. Touch panel 60 is closer to translucent panel 50 at the curved portion 52 side than at flat surface 51. In touch panel 60, the curvature of a surface facing curved portion 52 of translucent panel 50 can be made smaller than the rear-side curvature of curved portion 52 of translucent panel 50 by the thickness of adhesive sheet 80, which can prevent touch panel 60 from being bent at a small radius of curvature to cause breaking of transparent electrodes 612, 613 and lead wires 613, 623.

Adhesive sheet 80 only needs to be located on flat surface 51 of translucent panel 50, which brings another advantage in that the operation of affixing adhesive sheet 80 can be simplified as compared with the case of affixing adhesive sheet 80 even to curved portions 52.

Display 70 is located on the rear surface of touch panel 60, as shown in FIG. 4. A liquid crystal display panel can be employed as display 70, and is located such that a display surface thereof faces touch panel 60.

A super view resin (SVR) 86 can be interposed between display 70 and touch panel 60, as shown in FIG. 4. By placing the super view resin between display 70 and touch panel 60, an air gap therebetween can be eliminated to increase the visibility and contrast of display 70.

Translucent panel 50 described above is attached to casing 20 so as to include touch panel 60 and display 70 to form electronic device 10. The present disclosure can also be applied to an electronic device including two translucent panels 50 each including a curved portion, with a touch panel located below each of translucent panels 50. The present disclosure can also be applied to a cylindrical or elliptical cylindrical electronic device, whose side surface on the entire circumference is formed from a hollow material, with a touch panel formed on a hollow inner wall.

Casing 20 has translucent panel 50 attached to its front side as shown in FIGS. 1 and 2, and a control board for exerting control and the like of electronic device 10, a battery, a memory card, a SIM (Subscriber Identity Module) card, and other electronic components 12 necessary for making communications, phone calls and the like are stored in casing 20.

For example, as shown in FIGS. 3 and 4, casing 20 can be configured to include an inner chassis 21 with an opening 22 formed therein and a back chassis 24 covering the rear surface of inner chassis 21, but the present disclosure is not limited to this. Back chassis 24 may be attachable to/detachable from inner chassis 21, so that a battery, a memory card, a SIM card, or the like can be mounted and replaced, for example.

Translucent panel 50 is attached to inner chassis 21. More specifically, translucent panel 50 is attached to inner chassis 21 with display 70 fitted into opening 22 formed in inner chassis 21 and the tip of curved portion 52 of translucent panel 50 fitted into a recess 31 serving as an attaching surface formed in inner chassis 21. The attaching surface is not limited to recess 31, but may have a flat or projecting shape.

As shown in FIG. 4, an adhesive 82 like a thermosetting resin, such as an epoxy resin, is applied to recess 31, and translucent panel 50 is attached thereto.

When adhesive 82 is hardened, the attachment of translucent panel 50 and the like to inner chassis 21 is completed. Thereafter, mounting of necessary electronic components 12 and electric connection of touch panel 60, display 70 and the like are conducted, and back chassis 24 is fitted into inner chassis 21 to manufacture electronic device 10.

In obtained electronic device 10, the likelihood of breaking of transparent electrodes 612, 622 and lead wires 613, 623 of touch panel 60 can be reduced as much as possible, and the reliability of electronic device 10 can be increased.

Touch panel 60 is located not only on flat surface 51 of translucent panel 50 but also on the rear surface of curved portions 52, a user can operate electronic device 10 by touching not only flat surface 51 of translucent panel 50 but also curved portions 52, which can increase the operability and operational variations of electronic device 10 as much as possible.

EXAMPLES

Touch panel 60 was bent at different angles, and the electric resistance of second transparent electrodes 622 was measured.

In a disclosed example, transparent electrodes 622 were located on the rear side of transparent substrate 621 as described above (see FIG. 8), while in a comparative example, transparent electrodes were located on the front side of a transparent substrate. Three touch panels 60 bent at bending angle β of 30°, 45° and 60°, respectively, were prepared. The electric resistance value of the second transparent electrodes was measured by a tester with touch panel 60 bent at each bending angle β, thereby determining whether the second transparent electrodes maintained the conductive state or were in a broken state. Results are shown in Table 1.

Figure 11:
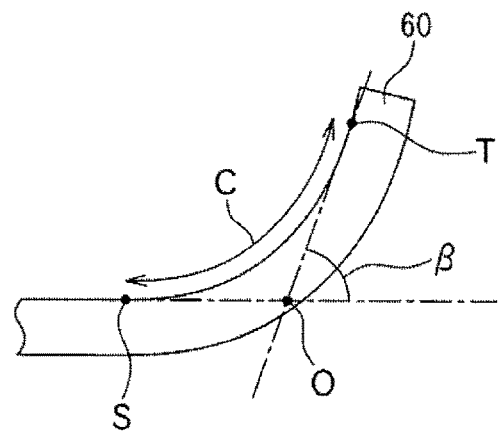
FIG. 11 is an explanatory drawing of a definition of a bending angle in an embodiment.

On the surface of curved region C of touch panel 60 as shown in FIG. 11, supposing that a tangent of a point S at which curved region C starts and a tangent of a point T at which curved region C ends intersect at a point O, bending angle β indicates a supplementary angle of an angle SOT. For example, touch panel 60 having bending angle β of 30° can be manufactured by pressing touch panel 60 against a triangular jig including a corner portion having an interior angle of 150° such that the transparent electrodes are located on the jig side. Bending angle β can be calculated by taking and analyzing the cross section of touch panel 60.

TABLE 1

|  | bending angle β 30° | bending angle β 45° | bending angle β 60° |
| --- | --- | --- | --- |
| Disclosed Example | conductive state | conductive state | conductive state |
| Comparative Example | conductive state | broken state | broken state |

Referring to Table 1, it is understood that in touch panel 60 having bending angle β of 30°, the second transparent electrodes maintained the conductive state both in the disclosed example and the comparative example, while in touch panel 60 having bending angle β of more than or equal to 45° of the comparative example, the second transparent electrodes were in a broken state. This is because, by bending touch panel 60, the transparent electrodes were pulled under a force in the elongation direction and were cracked. In the disclosed example in which transparent electrodes 622 were located on the rear side of transparent substrate 621, a force in the contraction direction was exerted on transparent electrodes 622 when touch panel 60 was bent, with the result that breaking could be prevented.

From the above-described examples, it is understood that the present disclosure is effective particularly when bending angle β of touch panel 60 is more than or equal to 45°.

The above description is used for illustrating the present disclosure. The above description is not to be construed as limiting the disclosure recited in claims or as restricting the scope. Each feature in the present disclosure is not limited to the above-described embodiment, but various modifications can be made thereto within the technical scope recited in the claims.

Figure 10A:
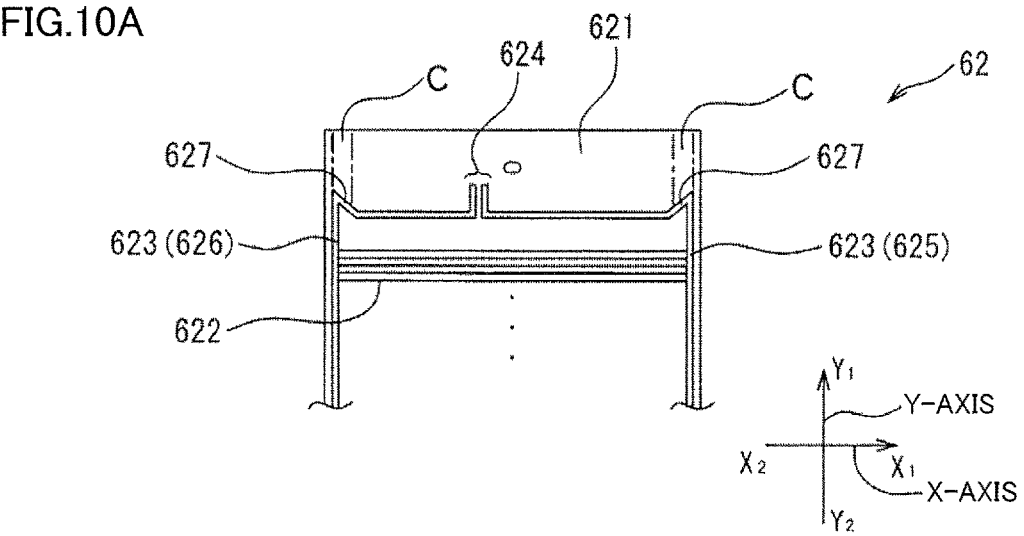
FIGS. 10A and 10B are enlarged views of the second electrode unit.
Figure 10B:
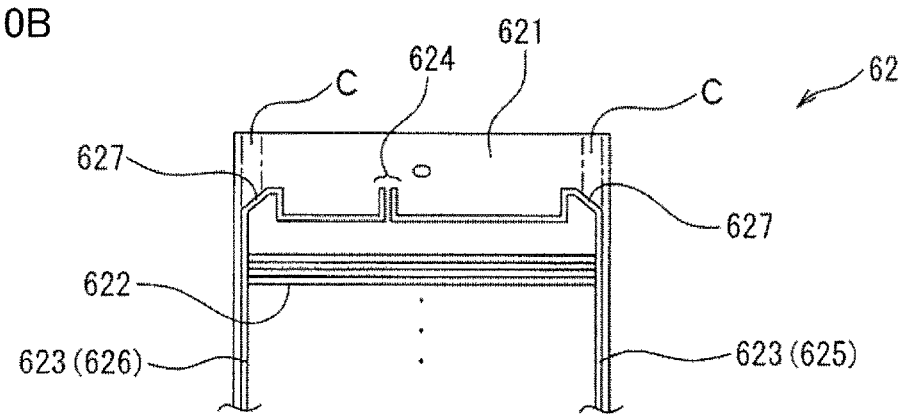

For example, inclined wiring portions 617, 627 of lead wires 613, 623 are not limited to the wiring pattern shown in FIGS. 6 and 7. For example, FIGS. 10A and 10B show different wiring patterns of second inclined wiring portion 627 of second lead wire 623. Specific examples of second inclined wiring portion 627 include a case shown in FIG. 10A where second inclined wiring portion 627 is inclined toward the $Y_1$ direction in curved region C, a case shown in FIG. 10B where lead wire 623 is routed substantially in parallel to the Y-axis toward the $Y_1$ direction between curved regions C, C, and then second inclined wiring portion 627 is inclined toward the $Y_2$ direction in curved region C, and the like. Of course, these wiring patterns are not limitations. The same applies to the wiring pattern of first inclined wiring portion 617 of first lead wire 613.

In the above-described embodiment, inclined wiring portions 617, 627 are located in lead wires 613, 623, but may be located in transparent electrodes 612, 622, respectively. The inclined wiring portions may be formed only in one or some of lead wires and/or transparent electrodes crossing curved region C.

The order of assembling translucent panel 50 and touch panel 60 and their configurations, the order of assembling inner chassis 21 and its configuration, the configuration of electronic device 10, and the like are not limited to the above-described embodiment.

According to an electronic device of an embodiment of the present disclosure, transparent electrodes and/or wires facing a curved portion of a translucent panel can be prevented from breaking in an electrode unit of a touch panel.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic device comprising:
a casing,
a translucent panel including a curved portion, the curved portion being bent toward the casing;
an adhesive layer; and
a touch panel located on a rear surface of the translucent panel, the touch panel including a first region facing the curved portion and a second region, and including at least one of a transparent electrode and a wire electrically connected to the transparent electrode,
the wire including an inclined wiring portion located in the first region, wherein the inclined wiring portion is inclined at a predetermined angle with respect to a width-direction axis of the electronic device in the curved region, while also being curved to match the first region, wherein at least one part of the first region is in direct contact with the translucent panel and at least one part of the second region is fixed to the translucent panel via the adhesive layer and wherein a gap is formed between portions of the touch panel and the translucent panel located between the first and second regions.

2. The electronic device according to claim 1, wherein the touch panel further includes a transparent substrate, and
the transparent electrode and the wire are located on a rear surface of the transparent substrate.

3. The electronic device according to claim 1, wherein the curved portion is located at a position closer to an end of the translucent panel than the longitudinal central line of the translucent panel.

4. The electronic device according to claim 1 wherein the inclined wiring portion is inclined at an angle of more than or equal to 45° and less than or equal to 70° with respect to the width direction axis.

* * * * *